Patented Nov. 10, 1931

1,830,749

UNITED STATES PATENT OFFICE

WILLIAM S. CALCOTT AND WILLIAM A. DOUGLASS, OF PENNS GROVE, NEW JERSEY, ASSIGNORS TO E. I. DU PONT DE NEMOURS & COMPANY, OF WILMINGTON, DELAWARE, A CORPORATION OF DELAWARE

METHOD OF COMPOUNDING RUBBER

No Drawing.    Application filed June 13, 1929.    Serial No. 370,735.

This invention relates to a method of treating rubber and the resulting rubber product and is more particularly concerned with a method of treatment whereby a rubber product is obtained which is unusually resistant to deterioration and oxidation.

It is generally accepted that the rate of deterioration of rubber articles differs greatly depending on various factors such as the composition of the stock, the form of the article and the conditions under which it is used. Various materials have heretofore been incorporated in rubber stocks to inhibit deterioration. However, most of the agents heretofore employed for this purpose have been open to the objection that they discolor the rubber. For some purposes, such as white and light colored stocks it is essential that the rubber composition contain nothing which will cause discoloration of the cured stock even after exposure to direct sunlight.

The use of certain phenolic compounds to retard the deterioration of rubber has been suggested as, for example, in British Patents #181,365 and #142,083. In general, however, the phenolic compounds mentioned have a very great retarding effect upon vulcanization when the vulcanization is carried out in a press. For example, Pelizzola (Giorn. Chem. Ind. Applicata 6, (1924) 59—60) found that the addition of 1 part of pyrogallol to a mixture of 100 parts of rubber and 8 parts of sulfur increased the time required for vulcanization from 2 hours to 4 hours at 144° C. We have found that phenol, resorcinol, and hydroquinone also exert this effect of retarding the vulcanization with certain accelerators so that their use is not always practical.

The primary object of this invention, therefore, is to provide a method for retarding the deterioration of rubber by the use of materials which cause practically no subsequent discoloration by exposure to direct sunlight and which at the same time do not retard the cure.

With these objects in view, we have discovered that compounds having the general formula

HO—R—R' wherein R and R' represent aryl or alkyl aryl hydrocarbon radicals, the aryl nuclei of which are directly connected by a single bond, may be added to a rubber mix without affecting the rate of cure. The resulting rubber when vulcanized exhibits a greatly increased resistance to deterioration as compared to rubber which contains no antioxidant. Moreover, when so incorporated, these materials cause no substantial discoloration even upon exposure to direct sunlight.

In order to disclose the invention in detail, the following examples of actual embodiments thereof are presented. It should be understood however that these examples are furnished purely for purposes of illustration and that it is not the intention that the invention be limited to the particular reagents, proportions or other conditions therein specified.

*Example 1*

Para-hydroxy-diphenyl,

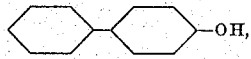

is a typical example of the above described type of compound and its use as an antioxidant is illustrated below.

Two stocks were made up of the following composition; the proportions given are by weight.

|  | Stock A | Stock B |
|---|---|---|
| Smoked sheets | 100 | 100 |
| Sulfur | 2.75 | 2.75 |
| ZnO | 18.15 | 18.15 |
| Diorthotolylguanidine | 0.5625 | 0.5625 |
| p-hydroxy-diphenyl |  | 1.0 |

The two stocks were then cured under 40 lbs. of steam for 30 minutes. The cured samples were thereupon aged in an oxygen bomb at 70° C. under 300 lbs. of oxygen. The time required for complete deterioration of the two stocks is indicated below:

Days
For stock A _____ 5
For stock B _____ 12

It will be noted that the resistance to deterioration of the stock containing the antioxidant was 140% greater than that of the stock containing no antioxidant.

The amount of discoloration was determined by exposure to the Fade-ometer, sun under glass, and directly to sun. The presence of p-hydroxy-diphenyl caused no greater discoloration than that observed in the control.

*Example 2*

The effect on color of antioxidants of this type was also tested in the following stock of better light stability:

|   | Stock A | Stock B |
|---|---|---|
| Rubber | 100 | 100 |
| ZnO | 3 | 3 |
| Titanox | 50 | 50 |
| S | 2 | 2 |
| Tetra-methyl-thiuram-monosulfide | 0.2 | 0.2 |
| p-hydroxy-diphenyl | | 1.0 |

Titanox is a pigment containing approximately 75% barium sulfate and 25% titanium oxide. (Gardner, "Chemical Synonyms and Trade Names", p. 250.)

The two stocks were cured at 20 lbs. steam pressure for 20 minutes. Tests for discoloration as indicated in Example 1 disclosed that the stock B containing the antioxidant showed no greater discoloration than the control stock A.

It is often advantageous to treat vulcanized rubber with reagents in order to improve its aging characteristics. The group of compounds disclosed hereinabove is particularly useful for this purpose. In general, the antioxidant is dissolved in a solvent and the cured stock is then immersed in the solution. After sufficient time has elapsed to permit the desired degree of absorption, the solvent is removed in an evacuated desiccator. An example of this modification of the process follows.

*Example 3*

A solution containing 6.4% of para-hydroxy-diphenyl was made by dissolving 1 part by weight of the antioxidant in a mixture of 1.9 parts by weight of ethylene-glycol-monomethyl-ether and 12.8 parts of benzene. Vulcanized rubber prepared by curing the stock of the following composition

| Smoked sheets | 100 |
| Zinc oxide | 18.15 |
| Sulfur | 2.75 |
| Diorthotolylguanidine | 0.5625 | for 40 minutes at 40 lbs. steam pressure was cut into strips. These strips were immersed in the solution described above for 30 minutes and the solvent removed in an evacuated desiccator.

For purposes of comparison, a strip of the same stock was immersed in ordinary commercial benzene and another strip was left untreated.

The three samples of rubber were then aged in an oxygen bomb at 70° C. under 300 lbs. of oxygen pressure. The time required for a complete deterioration is given below:

|   | Days |
|---|---|
| Control untreated | 6 |
| Benzene treated | 7 |
| Treated with para-hydroxy-diphenyl solution | 21 |

It will be noted that the resistance to deterioration of the stock treated with a solution of the antioxidant is more than 200% above that of the untreated stocks.

Among other members of the new group of antioxidants in which R and R' are aryl groups, Y is hydrogen and the aryl nuclei are directly connected by a single bond, the following compounds have been actually tested and found to have antioxidant properties comparable to those of para-hydroxy-diphenyl.

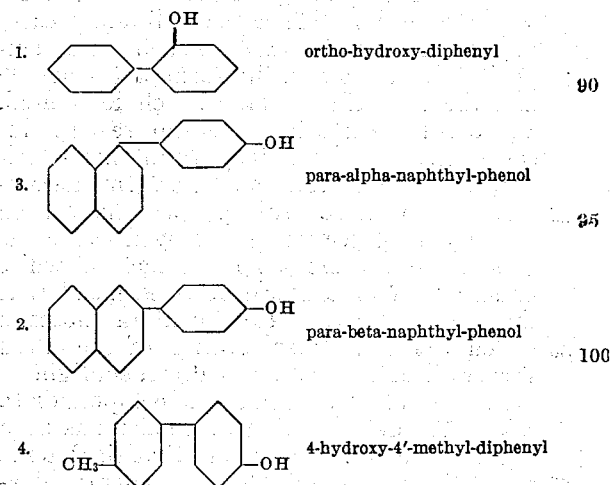

1. ortho-hydroxy-diphenyl
3. para-alpha-naphthyl-phenol
2. para-beta-naphthyl-phenol
4. 4-hydroxy-4'-methyl-diphenyl Many other compounds falling within this general class could be named and the above compounds are listed merely by way of illustration. It is obvious that the two aryl groups may be connected in various positions and that the hydroxy group may be attached to its aryl nucleus in various positions with respect to the other aryl nucleus. Also, it is obvious that compounds of the type listed may contain substituents in the aryl group, such as, for example, alkyl groups, which groups would have very little effect upon the properties of the particular compound.

The antioxidants may be incorporated into the rubber by any well known means, such as milling them into the stock upon the rolls of an ordinary mill. Moreover, they may be employed in various rubber compounds and rubber substitutes such as, for example, gutta-percha, balata, and synthetic rubber and it is therefore to be understood that the invention is not limited to any particular rubber stock or rubber compound. Also, the proportions of the antioxidant employed may be varied within wide limits although under ordinary circumstances about 1% of the antioxidant based on the weight of the stock treated has been found to be highly satisfactory.

As many apparent and widely different embodiments of this invention may be made without departing from the spirit thereof, it is to be understood that we do not limit ourselves to the foregoing examples or description except as indicated in the following claims.

We claim:

1. A process of increasing the resistance of rubber to deterioration due to aging which comprises the step of incorporating with the rubber a monohydroxy antioxidant having the general formula

HO—R—R′ wherein R and R′ represent aryl radicals.

2. A process of increasing the resistance of rubber to deterioration due to aging which comprises the step of incorporating with the rubber an antioxidant having the general formula

HO—R—R′ wherein R and R′ represent aryl radicals, at least one of which represents a phenyl radical.

3. A process of increasing the resistance of rubber to deterioration due to aging which comprises the step of incorporating with the rubber an antioxidant having the general formula

4. In the preparation of vulcanized rubber, the steps of incorporating with the rubber, prior to vulcanization, a vulcanizing agent and a monohydroxy antioxidant having the general formula

HO—R—R′

(wherein R and R′ represent aryl radicals) and thereafter vulcanizing.

5. In the preparation of vulcanized rubber, the steps of incorporating with the rubber, prior to vulcanization, a vulcanizing agent and an antioxidant having the general formula

HO—R—R′

(wherein R and R′ represent phenyl groups) and thereafter vulcanizing.

6. Rubber containing an antioxidant of the class set forth in claim 1.

7. Rubber containing an antioxidant of the class set forth in claim 3.

8. A vulcanized rubber article obtained by incorporating with the rubber mix, prior to vulcanization, an antioxidant of the type set forth in claim 1 and thereafter vulcanizing.

9. A vulcanized rubber article obtained by incorporating with the rubber mix an antioxidant of the type set forth in claim 2 and thereafter vulcanizing.

10. A vulcanized rubber article obtained by incorporating para-hydroxy-diphenyl with the rubber mix and thereafter vulcanizing.

11. A process of increasing the resistance of rubber to deterioration due to aging, which comprises the step of incorporating with the rubber para-beta-naphthyl phenol.

12. A process of increasing the resistance of rubber to deterioration due to aging, which comprises the step of incorporating with the rubber 4-hydroxy-4′-methyl diphenyl.

13. A vulcanized rubber article obtained by incorporating para-beta-naphthyl phenol with the rubber mix and thereafter vulcanizing.

14. A vulcanized rubber article obtained by incorporating 4-hydroxy-4′-methyl diphenyl with the rubber mix and thereafter vulcanizing.

In testimony whereof we affix our signatures.

WILLIAM S. CALCOTT.
WILLIAM A. DOUGLASS.